United States Patent Office 2,817,667
Patented Dec. 24, 1957

2,817,667

RED VAT DYESTUFFS OF THE PYRAZOL-ANTHRONE SERIES

Wilhelm Schmidt-Nickels, Little York, and David I. Randall, New Vernon, N. J., assignors to General Aniline & Film Corporation, New York, N. Y., a corporation of Delaware No Drawing. Application December 21, 1955
Serial No. 554,411

10 Claims. (Cl. 260—312)

This invention relates to novel vat dyestuffs of the pyrazolanthrone series yielding red colorations on cellulosic fibers when applied from an alkaline hydrosulfite vat with subsequent oxidation, and to a process for preparing them.

The new dyestuffs have the following general formula:

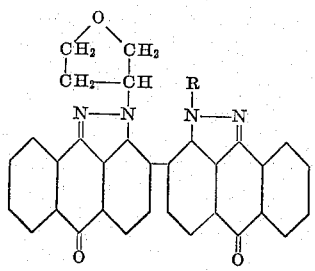

wherein R is a 3-tetrahydrofuryl group or an alkyl group, preferably containing up to eight carbon atoms. The dyeings produced by these compounds when applied to cellulosic fibers such as cotton textile fabrics from an alkaline hydrosulfite vat followed by oxidation to develop the dyestuff on the fiber yield red shades which are generally yellower and brighter than those produced with corresponding N,N'-diethyl-dipyrazolanthrones. The dyeings also show excellent fastness to chlorine and light and are not sensitive to soaping.

The preparation of these compounds in accordance with this invention involves reaction of an alkali metal salt of dipyrazolanthrone with an ester (preferably a mononuclear arylsulfonic acid ester) of 3-tetrahydrofuryl alcohol, alone or combined with a corresponding ester of a monohydric alcohol, especially of the acyclic or mononuclear alicyclic series, and preferably containing up to eight carbon atoms, in an inert organic solvent. These reagents are advantageously mixed at elevated temperature after thoroughly comminuting the alkali metal salt of dipyrazolanthrone in the solvent. After filtering the reaction mixture, the reaction product obtained as the filter cake is washed, first with a water-miscible solvent such as acetone to remove the organic solvent, then with water to remove excess alkali and alkali metal salts, and then dried.

The products thus obtained can be converted to the corresponding leuco sulfuric ester salts by usual methods, including, for example, reduction with iron in the presence of a trace of cuprous salt in pyridine, together with chlorosulfonic acid, and conversion of the resulting leuco sulfuric ester into an alkali metal salt by treatment with sodium carbonate.

The invention will be more fully understood from the following examples, wherein parts and percentages are by weight, unless otherwise indicated:

Example 1

8.5 parts of dipyrazolanthrone potassium salt, containing 69.1% dipyrazolanthrone, was comminuted in a ball mill, together with 21.4 parts 4-chlorotoluene, and then mixed together with 48.2 parts of additional 4-chlorotoluene and 12.9 parts of para-toluenesulfonic acid-3-tetrahydrofuryl ester. 0.7 part of flaked potassium hydroxide was added, and the resulting mixture was agitated for ten hours at 125° C. After filtering at 110° C., the filter cake was washed with 4-chlorotoluene, followed by a little benzene, acetone, then water, and then dried.

The resulting product dyed cotton from an alkaline hydrosulfite vat a red shade which was much yellower than the corresponding ethylated dipyrazolanthrone, of which the vat-dyed coloration is a bluish tinted red. The dyeings were not sensitive to soaping and the fastness to chlorine and light was good. Solubility of the dyestuff when converted to leuco form in aqueous medium was good.

Preparation of para-toluenesulfonic acid-3-tetrahydrofuryl ester can be carried out by cooling a mixture of 29.3 parts of 3-hydroxytetrahydrofurane and 98.2 parts of pyridine to 0° C. and gradually adding 70 parts of para-toluenesulfochloride while maintaining the temperature below 5° C. The mixture is then agitated at 0–5° C. for two hours and then gradually diluted with 20 parts of water while maintaining the temperature not higher than 5° C. On dilution with 1200 parts of ice water, the ester is precipitated and is recovered by filtration as the filter cake.

Example 2

8.9 parts of dipyrazolanthrone potassium salt containing 65.5% dipyrazolanthrone was comminuted in 21.4 parts of 4-chlorotoluene for four hours in a ball mill and then mixed with 48.2 parts of 4-chlorotoluene and 3.7 parts of para-toluenesulfonic acid-3-tetrahydrofuryl ester. 0.7 part of flaked potassium hydroxide was added, and the mixture was agitated at 125° C. for four hours. Thereupon, 3 parts of para-toluenesulfonic acid ethyl ester were added and agitation continued at 125° C. for four hours. The resulting dyestuff was isolated by filtration and washed as in Example 1. The product yielded bright red colorations when dyed on cotton from an alkaline hydrosulfite vat, which shades were not so yellowish as those of the dyestuff of Example 1, but not so bluish as N,N'-diethyldipyrazolanthrone. As in the case of the dyestuff of Example 1, the colorations were insensitive to soaping and possessed good fastness to chlorine and light. The leuco compound was likewise characterized by good solubility in water.

Corresponding N-methyl-, N-chloroethyl-, N-cyclohexyl and N-isopropyl-N'-3-tetrahydrofuryl dipyrazolanthrones are prepared in Examples 3, 4, 5 and 6, respectively.

Example 3

The procedure of Example 2 was modified by substituting 2.8 parts of para-toluenesulfonic acid methyl ester for the three parts of para-toluenesulfonic acid ethyl ester employed therein. The resulting product yielded dyeings on cotton from an alkaline hydrosulfite vat which were slightly bluer than the dyestuff of Example 2. The colorations possessed similar fastness properties and the leuco form of the dyestuff has similar solubility in water.

Example 4

The procedure of Example 2 was repeated, except that 3.5 parts of para-toluenesulfonic acid beta-chloroethyl ester was substituted for the three parts of para-toluenesulfonic acid ethyl ester in Example 2. The product obtained in this manner yielded vat dye colorations on cotton which were slightly bluer than those of the dyestuff in Example 1, with which it is substantially identical in other respects.

Example 5

8.8 parts of dipyrazolanthrone potassium salt containing 66.4% of dipyrazolanthrone were comminuted in a ball mill for seven hours together with 26 parts of dichlorobenzene. The mixture was diluted with 58.5 additional parts of dichlorobenzene and there were added thereto 3.8 parts of para-toluenesulfonic acid-cyclohexyl ester and .7 part of flaked potassium hydroxide. The mixture was then agitated at 125° C. for three hours. 3.7 parts of para-toluenesulfonic acid-3-tetrahydrofuryl ester were added and agitation continued at 125° C. for four hours. The mixture was filtered after cooling to room temperature, and the filter cake washed successively with dichlorobenzene and ethanol, and then boiled with a mixture of 160 parts of ethanol with 24.4 parts of 20% aqueous sodium hydroxide. The mixture was then filtered and the dyestuff washed with a similar aqueous alcoholic sodium hydroxide solution, of similar composition to the mixture previously added. After a final washing with water, the filter cake was dried. The resulting dyestuff yielded red colorations on cotton from an alkaline hydrosulfite vat, which were yellower than the product of Example 2, but similar to the latter in fastness to light, chlorine and soaping.

Eaxmple 6

8.8 parts of dipyrazolanthrone potassium salt containing 66.4% of dipyrazolanthrone are comminuted in a ball mill together with 26 parts of dichlorobenzene. The mixture was diluted with 58 parts of dichlorobenzene, and 3.7 parts of para-toluenesulfonic acid-3-tetrahydrofuryl ester and 0.7 part of flaked potassium hydroxide were added thereto. The mixture was agitated at 125° C. for four hours, and cooled to room temperature. 4.3 parts of para-toluenesulfonic acid-isopropyl ester were then added and the temperature again raised to 125° C., the mixture being agitated at this temperature for four hours. The dyestuff was isolated from the resulting mixture in the same manner as in Example 5. The product yielded red colorations on cotton from an alkaline hydrosulfite vat which were yellower than those produced with the dyestuff of Example 5. The colorations possessed fastness properties to chlorine, light and soaping substantially identical with those of the preceding example.

Example 7

21.2 parts of chlorosulfonic acid were mixed with 117.6 parts of dry pyridine while maintaining the temperature below 60° C. The mixture was cooled to 48° C. and there were successively added thereto 12 parts of bis-N,N'-(3-tetrahydrofuryl)-dipyrazolanthrone prepared according to Example 1, 8.1 parts of iron powder (iron "by hydrogen") and 0.2 part of cuprous chloride. The mixture was agitated under an atmosphere of $CO_2$ at 53–55° C. for four hours, and then poured into a solution in 235 parts of water for 40 parts of sodium carbonate. After removing pyridine by distillation under reduced pressure, the distilland was filtered at room temperature, yielding the leuco sulfuric ester in the filter cake. The cake was mixed with 2000 parts of water and 12.2 parts of 20% aqueous sodium hydroxide, and the mixture boiled. The solution was salted at room temperature with 84 parts of sodium carbonate. The mixture was filtered and the cake mixed with a solution of .5 part of soda ash in 5 parts of water, and then dried at room temperature. The resulting sulfuric ester sodium salt of leuco bis-N,N'-(3-tetrahydrofuryl)-dipyrazolanthrone can be applied in a printing paste to cotton or animal fiber materials, and the prints developed under acid oxidizing conditions to yield colorations having shades similar to those produced with the parent vat dyestuff. The resulting prints have equally good fastness to soaping, chlorine and light.

Example 8

Preparation of leuco sulfuric ester sodium salt of the vat dyestuff of Example 2, which is N-3-tetrahydrofuryl-N'-ethyldipyrazolanthrone, was carried out by the procedure of Example 7, except that the amount of iron was reduced to 7.8 parts, and soda ash added to the leuco sulfuric ester reaction mixture after initial dilution with water was reduced to 39 parts. Moreover, the quantity of vat dyestuff as prepared in Example 2 was increased to 12.5 parts. After final filtration, the cake was mixed with a solution of 0.5 part of sodium carbonate in 5 parts of water, and dried in vacuo at room temperature. The product, which is the sulfuric acid ester sodium salt of leuco N-tetrahydrofuryl-N'-ethyldipyrazolanthrone, yielded shades in printing similar to those obtained in vat dyeing with the parent vat dyestuff. The prints likewise have good fastness to chlorine, light and soaping.

In preparing the vat dyes of this invention, the alkali metal salt (e. g., the potassium or sodium salt) of dipyrazolanthrone is mixed at reaction temperature (advantageously at 100–150° C., and preferably about 125° C.) in inert organic solvent medium (e. g., a liquid chlorinated aromatic hydrocarbon such as chlorotoluene or dichlorobenzene) with the arylsulfonic acid ester of 3-tetrahydrofuryl alcohol, or successively (in either order) with this ester and the arylsulfonic acid ester of another monohydric alcohol of up to eight carbon atoms.

The quantity of the first of such esters, when successive portions of different esters are used to form the asymmetrical dyestuffs of the invention, is advantageously from 1.1–1.2 mols per mol of dipyrazolanthrone alkali metal salt, while the quantity of ester added thereafter to complete the alkylation is similarly employed in an amount 10–20% in excess of the equimolecular amount theoretically required. A larger excess in the case of a second ester can be used (e. g., up to 50% excess), but is generally not necessary. When a tetrahydrofuryl ester is used alone, the quantity is appropriately at least two mols per mol of dipyrazolanthrone salt, an excess of up to about 20% when employed being suitable. The successive reactions are allowed to proceed substantially to completion, requiring ordinarily from 1–4 hours for each step (or 5–12 hours for the entire alkylation) at the preferred temperatures of the order of 125° C.

Recovery of the vat dyes produced can be readily effected by filtration of the reaction mixture after completion of the condensation, alkali metal salts and other by-products being removed by washing the filter cake with fresh portions of the solvent medium, with a water-miscible solvent such as acetone with alcohol, and finally with water to remove the water-soluble salts.

The arylsulfonic esters, other than those of 3-tetrahydrofuryl alcohol, when employed in the process of the invention to introduce one of the N-alkyl groups in the vat dyestuffs of the invention, are esters of monohydric alcohols of the aliphatic (including the cycloaliphatic) series, which contain up to eight carbon atoms, as for example, methyl, ethyl, propyl, isopropyl, amyl, hexyl, or octyl alcohol, or the cyclohexanol or methylcyclohexanol, as well as substituted derivatives thereof in which the substituents are unreactive under conditions of preparation of the dyestuff, e. g., beta-chlorobutanol, benzyl alcohol, beta-ethoxyethanol, and the like. The N-alkyl groups thus introduced into the vat dyes, in addition to the N-tetrahydrofuryl group, when a different alcohol ester is employed, are the corresponding alkyl (including cycloalkyl) and substituted alkyl groups in which substituents are unreactive.

Other variations and modifications which will be obvious to those skilled in the art can be made in the invention, as described and illustrated above, without departing from the scope or skill thereof.

We claim:
1. A process for the preparation of a vat dyestuff com- prising reacting an alkali metal salt of dipyrazolanthrone with 1 molecular equivalent of an arylsulfonic ester of 3-tetrahydrofuryl alcohol, and 1 molecular equivalent of a member of the group consisting of the arylsulfonic esters of 3-tetrahydrofuryl alcohol and of unsubstituted, alkoxy-substituted and monochloro-substituted monohydric alcohols of up to 8 carbon atoms by heating a mixture of the reagents in an inert organic solvent medium, the second ester, when different from the first ester, being added after reaction of the first ester is substantially complete; and separating the resulting insoluble condensation product from the reaction mixture.

2. A process as defined in claim 1, in which said dipyrazolanthrone salt is heated with 2 mols of 3-tetrahydrofuryl alcohol ester in the absence of any other ester.

3. A process as defined in claim 1, wherein the quantities of arylsulfonic esters employed in successive steps are 10–20% in excess of an equimolecular proportion relative to the dipyrazolanthrone alkali metal salt.

4. A process as defined in claim 1, in which the vat dyestuff separated from the reaction mixture is converted to a corresponding leuco sulfuric acid ester by reduction with powdered iron and esterification in a mixture of pyridine and chlorosulfonic acid.

5. A dyestuff having the formula:

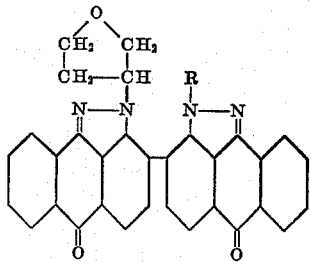

wherein R is a member of the group consisting of the tetrahydrofuryl radical, and unsubstituted, alkoxy-substituted and monochloro-substituted alkyl, cycloalkyl and aralkyl radicals containing up to eight carbon atoms.

6. A vat dyestuff having the formula:

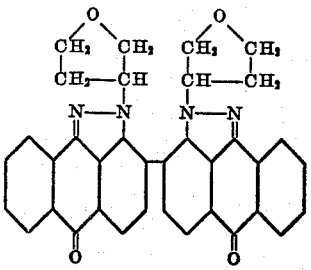

7. A vat dyestuff having the formula:

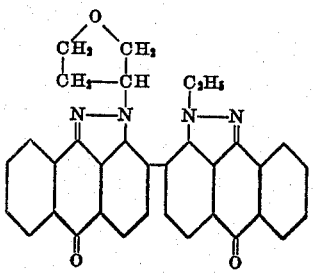

8. A vat dyestuff having the formula:

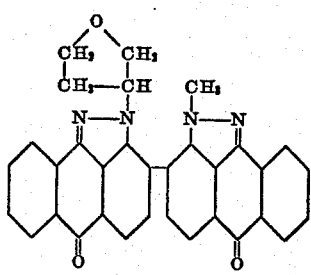

9. A vat dyestuff having the formula:

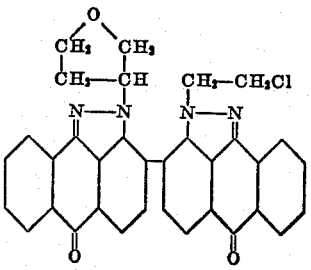

10. The leuco sulfonic ester salt of a dyestuff having the formula of claim 5.

No references cited.